(12) United States Patent
Chang et al.

(10) Patent No.: US 9,387,642 B2
(45) Date of Patent: Jul. 12, 2016

(54) PROCESS FOR MANUFACTURING A HEAT INSULATION CONTAINER

(71) Applicant: RICH CUP BIO-CHEMICAL TECHNOLOGY CO., LTD., Taichung (TW)

(72) Inventors: Sheng-Shu Chang, Taichung (TW); Hung-Ying Su, Taoyuan County (TW)

(73) Assignee: RICH CUP BIO-CHEMICAL TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 14/698,508

(22) Filed: Apr. 28, 2015

(65) Prior Publication Data

US 2015/0246499 A1    Sep. 3, 2015

Related U.S. Application Data

(63) Continuation-in-part of application No. 13/517,543, filed on Jun. 13, 2012, which is a continuation-in-part of application No. 12/566,437, filed on Sep. 24, 2009, now abandoned, which is a continuation-in-part of application No. 11/331,041, filed on Jan. 13, 2006, now abandoned.

(51) Int. Cl.
| | | |
|---|---|---|
| *D21H 19/00* | (2006.01) | |
| *B31B 7/00* | (2006.01) | |
| *B29C 70/66* | (2006.01) | |
| *B29C 44/12* | (2006.01) | |
| *B65D 81/38* | (2006.01) | |
| *D21H 19/36* | (2006.01) | |
| *D21H 19/58* | (2006.01) | |
| *D21H 19/62* | (2006.01) | |
| *D21H 21/54* | (2006.01) | |

(52) U.S. Cl.
CPC ............... *B31B 7/00* (2013.01); *B29C 44/1271* (2013.01); *B29C 70/66* (2013.01); *B65D 81/3874* (2013.01); *D21H 19/36* (2013.01); *D21H 19/58* (2013.01); *D21H 19/62* (2013.01); *D21H 21/54* (2013.01); *B31B 2217/062* (2013.01)

(58) Field of Classification Search
None
See application file for complete search history.

(56) References Cited

U.S. PATENT DOCUMENTS

| | | | | |
|---|---|---|---|---|
| 3,023,175 | A | | 2/1962 | Rodman, Jr. |
| 3,262,625 | A | * | 7/1966 | Russell ............... B29C 44/5636 138/140 |
| 3,627,858 | A | * | 12/1971 | Parts .................. B23K 26/0084 206/459.5 |

(Continued)

FOREIGN PATENT DOCUMENTS

| | | | | |
|---|---|---|---|---|
| JP | 03-061029 | * | 3/1991 | .............. B29C 67/22 |
| WO | WO 03/104338 A1 | | 12/2003 | |

*Primary Examiner* — Mandy Louie
(74) *Attorney, Agent, or Firm* — Muncy, Geissler, Olds & Lowe, P.C.

(57) ABSTRACT

A process for manufacturing a heat insulation container mainly includes preparing a coating material by mixing a binder and a thermo-expandable powder, coating such coating material on a surface of a container and then heating the container to foam the coated material after the container is shaped. The foamed coating material is therefore provides the container with heat insulation property. The thermo-expandable powder consists of a plurality of thermo-expandable microcapsules, each of which consists of a thermoplastic polymer shell and a solvent wrapped by the thermoplastic polymer shell. To obtain a smooth surface, the soften point of the binder is required to be lower than the boiling point of the solvent.

2 Claims, 5 Drawing Sheets

(56) References Cited

U.S. PATENT DOCUMENTS

| | | |
|---|---|---|
| 4,983,238 A | 1/1991 | Yoshida et al. |
| 5,490,631 A | 2/1996 | Ioka et al. |
| 5,498,860 A | 3/1996 | Ohno et al. |
| 5,759,624 A | 6/1998 | Neale et al. |
| 5,952,068 A | 9/1999 | Neale et al. |
| 6,598,786 B1 | 7/2003 | Guo |
| 7,202,284 B1 | 4/2007 | Limerkens et al. |
| 2002/0182347 A1 | 12/2002 | DeBraal et al. |
| 2004/0220303 A1 | 11/2004 | Tang et al. |
| 2006/0057291 A1 | 3/2006 | Duris et al. |

* cited by examiner

PROCESS FOR MANUFACTURING A HEAT INSULATION CONTAINER

This application is a Continuation-In-Part of prior U.S. patent application Ser. No. 13/517,543 filed Jun. 13, 2012, which is a Continuation-In-Part of prior U.S. patent application Ser. No. 12/566,437 filed Sep. 14, 2009, which is a Continuation-In-Part of prior U.S. patent application Ser. No. 11/331,041 filed Jan. 13, 2006, the entire contents of which are hereby incorporated by reference.

BACKGROUND OF THE INVENTION

1. Field of the Invention
2. Description of the Prior Art

A conventional container, in consideration of a cost and a purpose, is generally a paper-made or plastics-made container, such as a paper-made or plastics-made cup, bowl, and dish, or a filling container made of this material, such as a packaging container, a heat preservation container, and a lunch box. An existing paper-made container is provided with a single layer that cannot preserve and insulate heat. The container may be provided with two layers with a partition, the cost is, however, extremely high and the cost efficiency is not satisfying since the container is designed for one-time usage.

For heat insulation purpose, the existing paper-made cup is held with an additional plastic cup supporter. However, the addition of the plastic cup supporter is in conflict to the original design intention of the one-time-usage paper-made cup since the cup supporter has to be recycled and stored after the paper-made cup is thrown.

On the other hand, a heat insulation container composed of foamed material is provided to solve the previous problems. A conventional foamed container is manufactured by the process that the paper sheet is foamed before modeled to a container. However, the foamed paper sheet has a large volume and is difficult to be stacked. Also, a cutting machine is unable to cut the foamed paper sheet into desired shape due to the soft foamed layer. Moreover, stacked foamed paper sheets are unable to be fed into machines due to the large friction of the foamed layer, so that the yield rate is low.

Besides, some conventional foamed containers have a plurality of deficiencies. Patent publication US 2002/0182347 showed that the foaming layer composed of 60-90% by weight the microcapsules of foaming agent and 10-40% by weight the binder, and that the paper sheet is foamed before shaped into a container so that the problems mentioned above occur. That is, the microcapsules are much more than the binder. It results that the foaming layer may flake off in powder. Also, microcapsules are quite closed to each other and don't have enough space to expand. Moreover, a plurality of adjacent microcapsules may integrate into a larger capsule to form a rough surface. Thus, the process disclosed in US 2002/0182347 is impossible to be introduced in practice.

Another application of foamed paper sheet is shown in U.S. Pat. No. 5,498,860. '860 disclosed a card with a braille portion which is selectively protruded. "The binder of the braille portion is softened, and the microcapsules are foamed at the same time". However, the process is not suitable for manufacturing a container. When the softening point of the binder is the same with the foaming point of the microcapsules, the microcapsules are unable to be rearranged before foaming so that the foamed surface is rough. In addition, a preferred ratio of the binder and the microcapsules for heat insulation is not provided here. More specifically, a foamed braille portion of a card must have different composition from that of a heat insulation container due to the different purposes.

WO 03/104338 discloses that the foam coating comprising 1-99.9% or preferably 8-80% by weight of binder and preferably 5-25% by weight of the unexpanded. However, the binder is softened and the heat expandable particles are foamed at the same time. WO 03/104338 does not disclose step(s) for redistributing the heat expandable particles which are dried and cannot flow itself under only the effect of gravity without external force.

SUMMARY OF THE INVENTION

The main object of the present invention is to provide a process for manufacturing a heat insulation container.

To achieve the above object, the process of the present invention includes the following steps:

(a) preparing a coating material by mixing and blending a binder and a thermo-expandable powder consisting of a plurality of thermo-expandable microcapsules, the binder being selected from a group consisting of polyvinyl acetate resin, ethylene vinyl acetate resin, polyurethane resin and a mixture thereof, a mixing ratio of the binder and the thermo-expandable powder being 80-95 to 5-20 by weight, each thermo-expandable microcapsule consisting of a thermoplastic polymer shell and a low-boiling-point solvent wrapped by the thermoplastic polymer shell;

(b) coating the coating material on at least a part of an area specified on a continuous paper reel or a non-continuous paper sheet making up the container, and drying the paper reel or the paper sheet at a temperature which is lower than a soften point of the binder, wherein the binder, after drying, is normally non-free-flowing under the effect of gravity;

(c) cutting the coated paper reel or coated the paper sheet to a desired shape;

(d) modeling to the container;

(e) heating the coated continuous paper reel or the coated non-continuous paper sheet to the soften point of the binder which is lower than a boiling point of the solvent so that the binder has molecular flowability, wherein the binder is normally free-flowing under the effect of gravity under a temperature equal to or higher than the soften point of the binder;

(f) further heating the coated continuous paper reel or the coated non-continuous paper sheet to the boiling point of the solvent after the coated continuous paper reel or the coated non-continuous paper sheet is heated so that the solvent vaporizing to balloon the thermoplastic polymer shell, whereby the coating material is foamed and integrally attached on the coated continuous paper reel or the coated non-continuous paper sheet.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
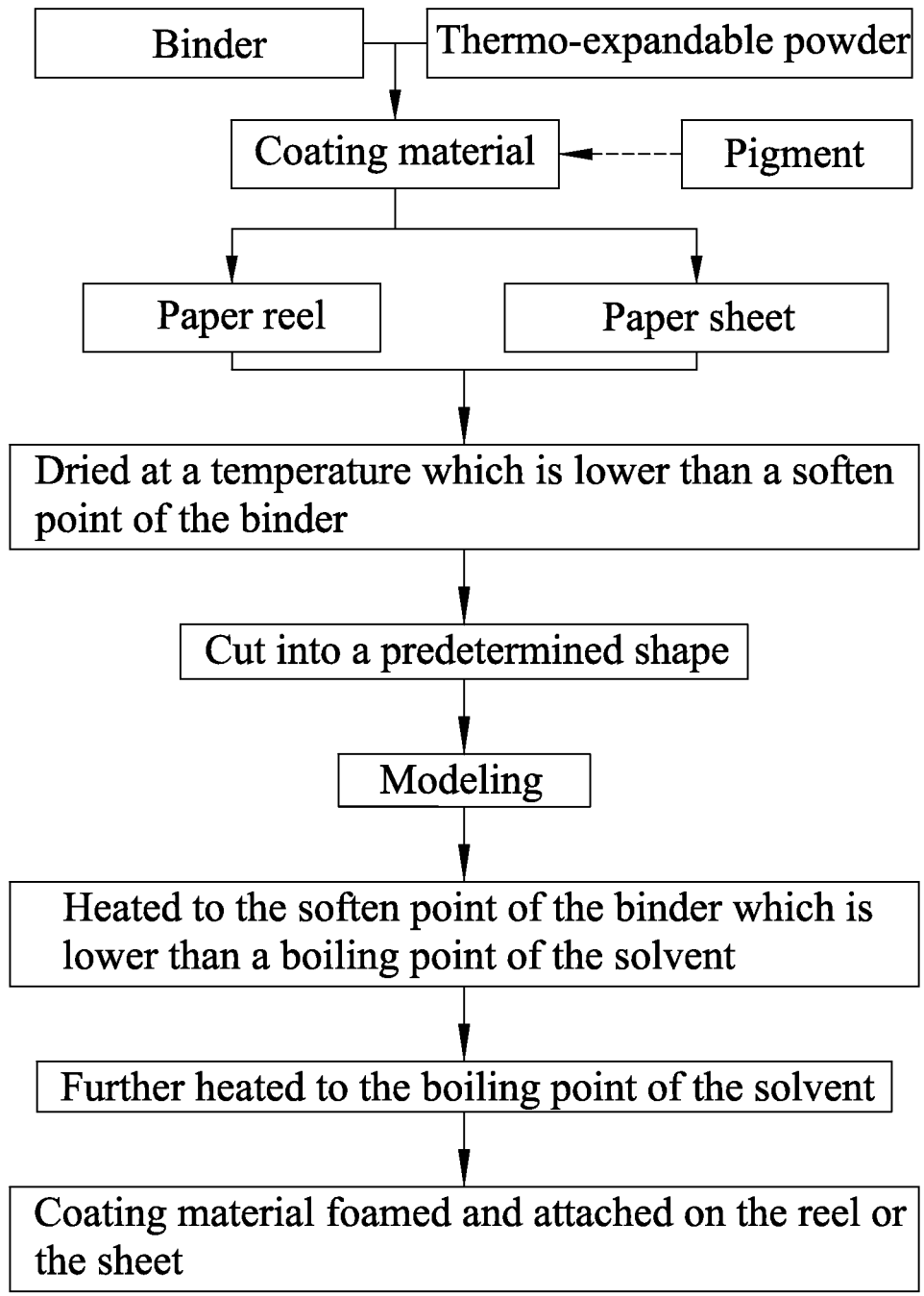
FIG. 1 is a flow chart of a process of the present invention.

Please refer to FIG. 1. A process for manufacturing a heat insulation container of the present invention includes the following steps:

(a) Preparing a coating material by mixing and blending a binder and a thermo-expandable powder. The thermo-expandable powder consists of a plurality of thermo-expandable microcapsules, each of which consists of a thermoplastic polymer shell and a solvent wrapped by the thermoplastic polymer shell. The binder is selected from a group consisting of polyvinyl acetate resin, ethylene vinyl acetate resin, polyurethane resin and a mixture thereof. Preferably, a mixing ratio of the binder to the thermo-expandable powder is 80-95 to 5-20 by weight.

Figure 2:
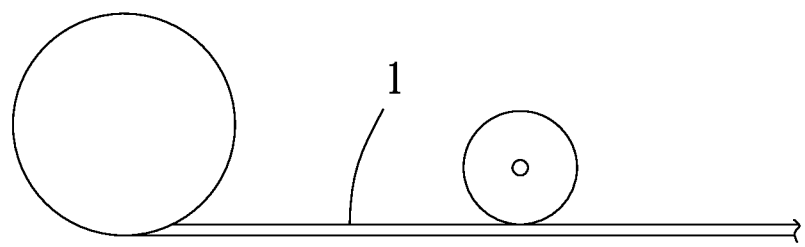
FIG. 2 is a drawing showing a continuous paper reel of the present invention.
Figure 3:
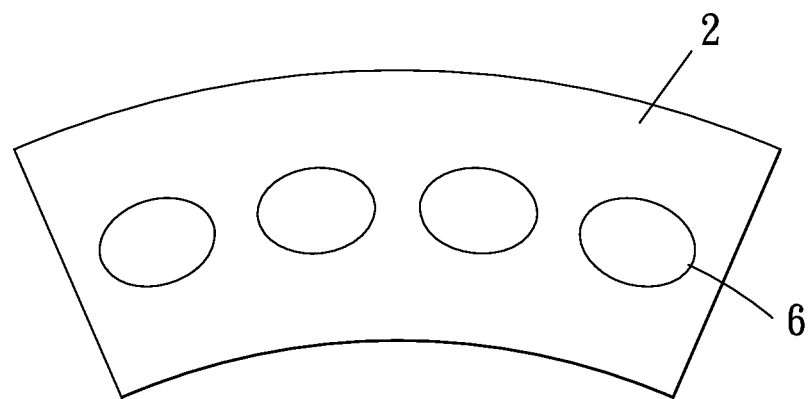
FIG. 3 is a drawing showing a non-continuous paper sheet of the present invention.
Figure 4:
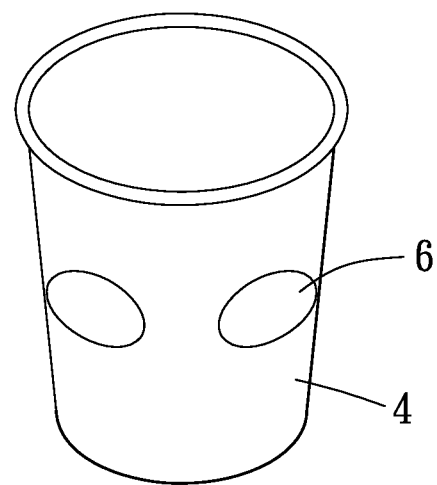
FIG. 4 is a drawing showing a container of the present invention.

(b) Coating the coating material on at least a part of an area specified on a continuous paper reel or a non-continuous paper sheet making up the container. The continuous paper reel 1 is a reel of paper sheet, as shown in FIG. 2. The non-continuous paper sheet 2 is cut into a predetermined shape, as shown in FIG. 3. The non-continuous paper sheet 2 may be cut from the continuous paper reel 1 and may be further formed into a container 4, as shown in FIG. 4. The coating material is coated on the area in the manner of rolling, spraying, printing or other process. The area to be coated is preferably a portion of a container where the user holds. After coated, the paper reel or the paper sheet is dried at a temperature which is lower than a soften point of the binder, wherein the binder, after drying, is normally non-free-flowing under the effect of gravity. After drying step, the unevenly-distributed thermo-expandable microcapsules are each in fixed positions and some of them are stacked and overlape with each other seriousely, and this can cause the final product have an uneven surface if the thermo-expandable microcapsules are not redistributed evenly in following step(s).

(c) Modeling the paper reel or the paper sheet to the container.

(d) Heating the coated continuous paper reel or the coated non-continuous paper sheet to the soften point of the binder which is lower than a boiling point of the solvent so that the binder has flowability, wherein the binder is normally free-flowing under the effect of gravity under a temperature equal to or higher than the soften point of the binder. Since the binder is heated first to be flowable itself (free-flowing) under the effect of gravity, the thermo-expandable microcapsules are automatically redistributed evenly and almost none of them are stacked and overlape with each other seriousely, and this can cause the final product have an extremely even surface.

Figure 5:
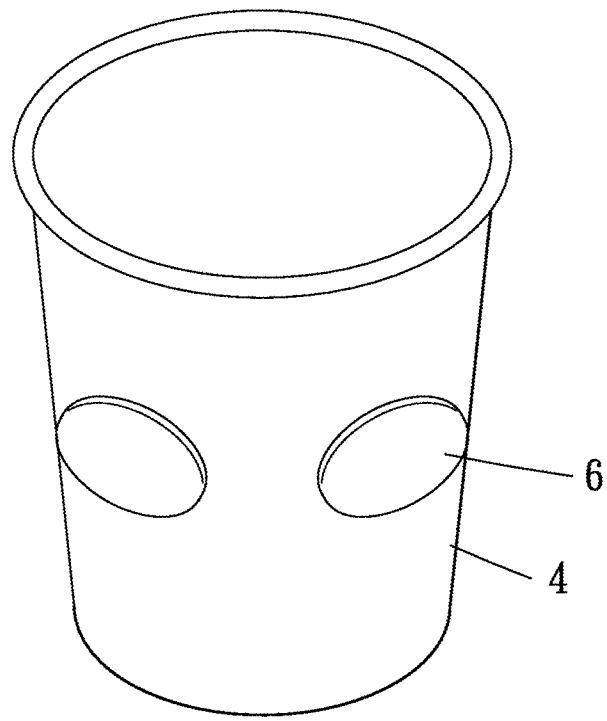
FIG. 5 is a drawing showing a container with a foamed coating material of the present invention.

(e) Further heating the coated continuous paper reel or the coated non-continuous paper sheet to the boiling point of the solvent after the coated continuous paper reel or the coated non-continuous paper sheet is heated so that the solvent vaporizes to balloon the thermoplastic polymer shell. Whereby, the coated material is foamed and integrally attached on the coated continuous paper reel, the coated non-continuous paper sheet or the coated container, as shown in FIG. 5.

In the invention, the term "normally non-free-flowing" refers to that under the effect of gravity the binder cannot flow itself without external force (by heat or pressure). The term "normally free-flowing" refers to that under the effect of gravity the binder can flow itself without external force.

Figure 6:
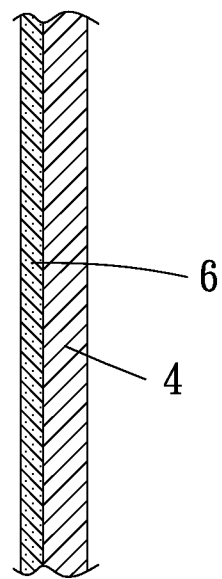
FIG. 6A is a profile showing a container with a foamed coating material of the present invention.
FIG. 6B is a profile showing a container with a foamed coating material of the present invention.
FIG. 6C is a profile showing a container with a foamed coating material of the present invention.
Figure 6:
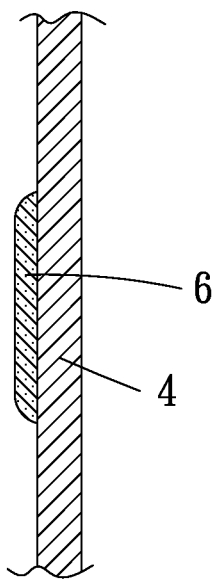
Figure 6:
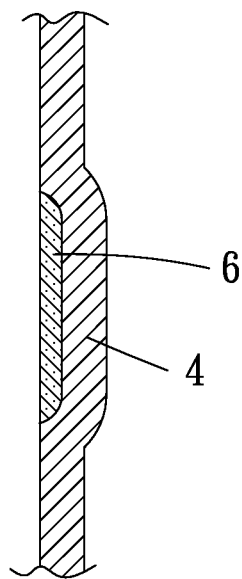

The coating material 6 can be applied on the entire surface of the reel, the sheet or the container 4, thus the coating material is foamed as shown in FIG. 6A. Alternatively, the coating material can be applied on only a part of the surface of the reel, the sheet or the container, and the foamed coating material 6 is more protrusive than the other uncoated surface of the reel, the sheet or the container 4, as shown in FIG. 6B. As such, a 3D pattern is obtained. In addition, the area to be coated may be more concave than the other area on the reel, the sheet or the container, and the coating material 6 is then heated to foam, as shown in FIG. 6C. Preferably, the foamed coating material 6 is flush with the other uncoated area of the outer surface. The foamed coating material provides the container with heat insulation property.

Figure 7:
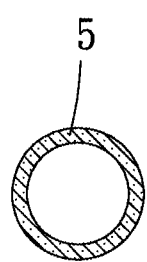
FIG. 7A is a profile showing a thermo-expandable microcapsule of the present invention.
FIG. 7B is a profile showing a thermo-expandable microcapsule during foaming of the present invention.
Figure 7:
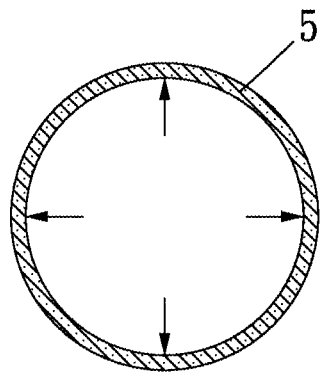

As shown in FIG. 7A, the solvent is wrapped by the thermoplastic polymer shell 5. When the coating material is heated to reach the boiling point of the solvent, the solvent starts to vaporize and balloon the thermoplastic polymer shell 5 as shown in FIG. 7B. The volume of the expanded thermo-expandable microcapsule can reach 20-50 times that of the un-expanded thermo-expandable microcapsule, thus the thickness of the foamed coating material is expected to be 5-15 times that of the un-foamed coating material. Due to the binder being pre-softened before the thermo-expandable microcapsules starts to foam, the slightly-flowable binder can, therefore, fill the micro gaps formed between the microcapsules. Since each of the expanded thermo-expandable microcapsules is a closed cell, and since the micro gaps between the microcapsules are filled by the slightly-flowable binder, the outer surface of the foamed coating material will be smoother than a conventional foaming material, and the foamed coating material will be watertight. It is to be noted that the coated reel, sheet or container is heated to reach the soften point of the binder first and then is further heated to the boiling point of the low-boiling-point solvent, i.e. the boiling point of the solvent is higher than the soften point of the binder. If the boiling point of the solvent were lower than the soften point of the binder, the thermo-expandable microcapsules would start foaming when the binder is still coagulated, thus the expansion of the microcapsules would be limited, and the foamed coating material might have leaks because the binder is non-flowable to fill the gaps between the microcapsules. Also note that the solvent has a boiling point at which a paper-made container would not have deformed seriously. And preferably, the heating temperatures in step (e) and step (f) fall within a range of 80-160 degrees Celsius.

For aesthetic or advertisement purpose, the foaming area may be further coated with a pigment layer to form patterns or messages. The pigment layer may be applied on the foaming area by conventional method such as printing, spraying or rolling. In addition, the coating material itself may also be mixed with a pigment. As such, the foamed coating material will look colorful and even have patterns. It is noted that since the outer surface of the foamed coating material is smooth, the pigment layer can be applied thereon without difficulty, and the patterns will not be vague.

In addition, with the process of the present invention, mass production becomes possible, and the procedures can run smoothly. The most important is that the yield rate is promoted, and the product is smooth surface and strengthened structure.

What is claimed is:

1. A process for manufacturing a heat insulation container, consisting of the following steps in order:
    (a) preparing a coating material by mixing and blending a binder and a thermo-expandable powder consisting of a plurality of thermo-expandable microcapsules, the binder being selected from a group consisting of polyvinyl acetate resin, ethylene vinyl acetate resin, polyurethane resin and a mixture thereof, a weight ratio of the binder to the thermo-expandable powder being 80:20 to 95:5, each thermo-expandable microcapsule consisting of a thermoplastic polymer shell and a solvent wrapped by the thermoplastic polymer shell, the coating material being further mixed with a pigment;
    (b) coating the coating material on at least a part of an area specified on a continuous paper reel or a non-continuous paper sheet, and drying the paper reel or the paper sheet at a temperature which is lower than a soften point of the binder, wherein the binder, after drying, is normally non-free-flowing under the effect of gravity;
    (c) cutting the coated paper reel or the coated paper sheet into a desired-shaped sheet;
    (d) modeling the desired-shaped sheet to form a container with the coating material;
    (e) heating the container with the coating material to the soften point of the binder which is within a range of 80-160 degrees Celsius and lower than a boiling point of the solvent so that the binder has molecular flowability, wherein the binder is normally free-flowing under the effect of gravity under a temperature equal to or higher than the soften point of the binder;
    (f) further heating the container with the coating material to the boiling point of the solvent which is within a range of 80-160 degrees Celsius so that the solvent vaporizing to balloon the thermoplastic polymer shell, whereby the coating material attached on the container is foamed to form a foamed coating material on the container, wherein a volume of the thermo-expandable microcapsule which is expanded reaches 20-50 times that of the thermo-expandable microcapsule which is un-expanded.

2. The process of the claim 1, wherein in the step (b), the area on the continuous paper reel or the non-continuous paper sheet is more concave than the other area on the continuous paper reel or the non-continuous paper sheet.

* * * * *